US012605996B2

(12) United States Patent
Godwin, Jr.

(10) Patent No.: US 12,605,996 B2
(45) Date of Patent: Apr. 21, 2026

(54) AUTOMATIC TARP CONTROL SYSTEM AND METHOD FOR DUMP TRUCKS

(71) Applicant: Intellectual Property Group, LLC, Dunn, NC (US)

(72) Inventor: James Patrick Godwin, Jr., Dunn, NC (US)

(73) Assignee: INTELLECTUAL PROPERTY GROUP, LLC, Dunn, NC (US)

( * ) Notice: Subject to any disclaimer, the term of this patent is extended or adjusted under 35 U.S.C. 154(b) by 13 days.

(21) Appl. No.: 18/587,602

(22) Filed: Feb. 26, 2024

(65) Prior Publication Data

US 2025/0269706 A1      Aug. 28, 2025

(51) Int. Cl.
      B60J 7/00 (2006.01)
      B60J 7/16 (2006.01)
      B60P 7/00 (2006.01)
(52) U.S. Cl.
      CPC .............. B60J 7/1607 (2013.01); B60P 7/00 (2013.01)
(58) Field of Classification Search
      CPC .................................. B60J 7/1607; B60P 7/00
      See application file for complete search history.

(56) References Cited

U.S. PATENT DOCUMENTS

| | | |
|---|---|---|
| 3,433,457 A | 3/1969 | Van Der Ende |
| 3,464,755 A | 9/1969 | Brown |
| 3,921,128 A | 11/1975 | Snead |
| 5,452,942 A | 9/1995 | Brooks |

| | | | |
|---|---|---|---|
| 8,299,734 B2 * | 10/2012 | Mullet | E06B 9/72 |
| | | | 160/310 |
| 10,538,965 B1 * | 1/2020 | Nguyen | F21V 33/006 |
| 10,913,337 B1 * | 2/2021 | Williams | B60J 7/085 |
| 11,220,304 B1 | 1/2022 | Bailey | |

(Continued)

FOREIGN PATENT DOCUMENTS

| | | |
|---|---|---|
| CA | 3072705 A1 | 8/2020 |
| JP | H10297349 A | 11/1998 |

(Continued)

OTHER PUBLICATIONS

WO2021026602_Fowler_2021.pdf.*

(Continued)

*Primary Examiner* — Jelani A Smith
(74) *Attorney, Agent, or Firm* — COATS & BENNETT, PLLC

(57)      ABSTRACT

A tarp control system for a dump truck controls a motorized spool to automatically extend and retract the tarp in response to a non-continuous input from a user. A rotary encoder attached to the motorized spool outputs the spool's motion to a controller. In response to user input, the controller controls the motor of the motorized spool to rotate in the proper direction to extend or retract the tarp. Rearward-biased tarp arms pull the tarp over the dump truck bed as the motorized spool unwinds. When the tarp reaches a (previously calibrated) fully extended position, the controller stops motion of the motorized spool. An inverse process retracts the tarp automatically in response to a non-continuous user input. The tarp control system allows a dump truck operator to initiate, then ignore, the tarp operation and concentrate on driving or other tasks, as the tarp extends or retracts automatically.

17 Claims, 5 Drawing Sheets

(56) References Cited

U.S. PATENT DOCUMENTS

| | | | |
|---|---|---|---|
| 11,377,805 | B2 | 7/2022 | Godwin, Jr. |
| 11,498,469 | B2 | 11/2022 | Wink |
| 2002/0117823 | A1 | 8/2002 | Mlsna et al. |
| 2005/0039968 | A1 | 2/2005 | Lashua |
| 2005/0234622 | A1 | 10/2005 | Pillar et al. |
| 2006/0231309 | A1 | 10/2006 | Lashua |
| 2008/0024463 | A1 | 1/2008 | Pryor |
| 2008/0208416 | A1 | 8/2008 | Yuet et al. |
| 2009/0105911 | A1 | 4/2009 | Okeson et al. |
| 2009/0205885 | A1 | 8/2009 | Strong |
| 2010/0133771 | A1 | 6/2010 | Hudson et al. |
| 2010/0188343 | A1 | 7/2010 | Bach |
| 2010/0213754 | A1 | 8/2010 | Dirr |
| 2010/0230993 | A1* | 9/2010 | Bremer .................... B60J 7/085 |
| | | | 296/98 |
| 2015/0070319 | A1 | 3/2015 | Pryor |
| 2015/0175353 | A1 | 6/2015 | Gillmore et al. |
| 2016/0075324 | A1 | 3/2016 | Brombach et al. |
| 2016/0264032 | A1 | 9/2016 | Terada et al. |
| 2017/0016757 | A1 | 1/2017 | Strong et al. |
| 2017/0023127 | A1 | 1/2017 | Greasamar et al. |
| 2017/0062148 | A1 | 3/2017 | Legel |
| 2017/0267043 | A1 | 9/2017 | Strong et al. |
| 2017/0344004 | A1 | 11/2017 | Foster et al. |
| 2018/0198846 | A1 | 7/2018 | Srinivasan et al. |
| 2018/0202539 | A1 | 7/2018 | Shibata et al. |
| 2018/0244155 | A1 | 8/2018 | Keenan et al. |
| 2019/0118605 | A1 | 4/2019 | Strong et al. |
| 2019/0322214 | A1 | 10/2019 | Gagnon |
| 2020/0039432 | A1 | 2/2020 | Lemieux |
| 2020/0354188 | A1* | 11/2020 | Martinson .............. B60J 11/025 |
| 2021/0155086 | A1* | 5/2021 | Pattabhiraman ...... B60R 16/033 |
| 2021/0156098 | A1 | 5/2021 | Godwin, Jr. |
| 2022/0410856 | A1 | 12/2022 | Wink |
| 2023/0398921 | A1 | 12/2023 | Godwin, Jr. |
| 2024/0034116 | A1 | 2/2024 | Coombs et al. |
| 2024/0300507 | A1* | 9/2024 | Pishock ................. B60K 35/00 |
| 2024/0301726 | A1 | 9/2024 | Godwin, Jr. |

FOREIGN PATENT DOCUMENTS

| | | | | |
|---|---|---|---|---|
| WO | WO-2012132366 | A1 * | 10/2012 | ............. B60R 5/047 |
| WO | WO-2021026602 | A1 * | 2/2021 | .............. B60R 5/00 |
| WO | 2022016238 | A1 | 1/2022 | |

OTHER PUBLICATIONS

WO2021026602_Nagao_2021.pdf.*

WO2012132366_Nagao_2012.*

WO2021026602_Fowler_2021.*

Jones, K., "Allied's Forward Controls put plow functions at driver's fingertips", APWA Snow Conference, May 28, 2019, pp. 1., Salt Lake City, Utah, https://www.trailer-bodybuilders.com/truck-bodies/article/21744020/allieds-forward-controls-put-plow-functions-at-drivers-fingertips.

\* cited by examiner

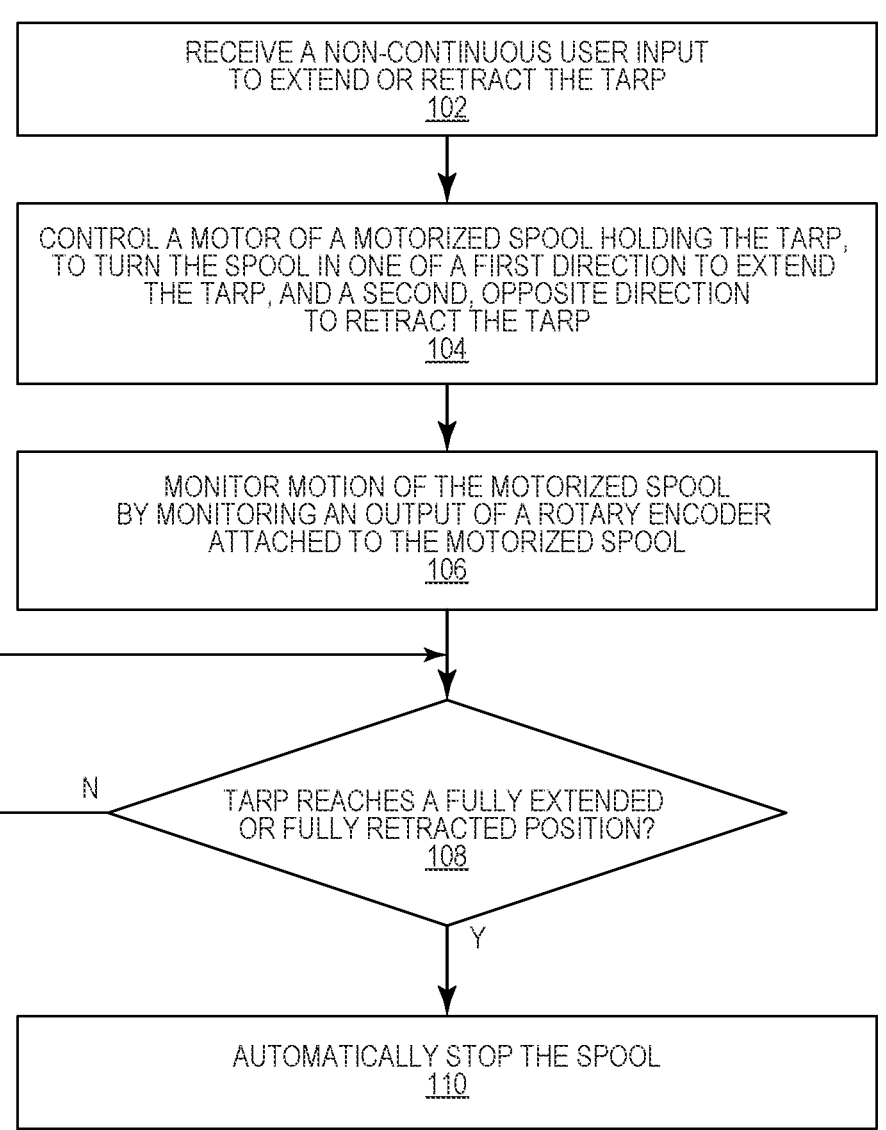

100

RECEIVE A NON-CONTINUOUS USER INPUT
TO EXTEND OR RETRACT THE TARP
102

CONTROL A MOTOR OF A MOTORIZED SPOOL HOLDING THE TARP,
TO TURN THE SPOOL IN ONE OF A FIRST DIRECTION TO EXTEND
THE TARP, AND A SECOND, OPPOSITE DIRECTION
TO RETRACT THE TARP
104

MONITOR MOTION OF THE MOTORIZED SPOOL
BY MONITORING AN OUTPUT OF A ROTARY ENCODER
ATTACHED TO THE MOTORIZED SPOOL
106

N      TARP REACHES A FULLY EXTENDED
OR FULLY RETRACTED POSITION?
108

Y

AUTOMATICALLY STOP THE SPOOL
110

FIG. 6

AUTOMATIC TARP CONTROL SYSTEM AND METHOD FOR DUMP TRUCKS

FIELD OF INVENTION

The present invention relates generally to dump trucks, and in particular to a system and method of automatically controlling the extension and retraction of a tarp over the dump truck bed.

BACKGROUND

The global market for dump trucks in 2022 was $8.1B, and is projected to increase to $15B by 2030. Dump trucks are used in mining, construction, waste management, snow and ice removal, and other industries. Growth in the dump truck market is driven by increased exploration in the mining industry, and renewed (post-COVID) investment in transportation infrastructure and industrial, commercial, and residential building construction. Investment in new dump trucks is required to meet stringent emissions and other environmental controls, and to take advantage of technological advances.

FIG. 1 depicts a typical dump truck 10. The dump truck 10 comprises a cab 12 and articulated bed 14. The bed 14 of a typical dump truck 10 comprises four sides of a six-sixed rectangular shape: a front wall, two side walls, and a floor. The top of the bed 14 is open, so the bed 14 may be filled from a tipple, front loader, or the like. The rear of the bed 14 is also open. A tail gate 16, which is hinged at the top and releasably connected to the side walls near the bottom, covers the rear opening. The bed 14 is pivotally connected to the dump truck frame at or near its rear, and one or more hydraulic pistons connect the bed 14 to the truck frame at or near the front of the bed 14. As the hydraulic piston(s) are extended, the bed 14 raises. If the tail gate 16 is released from the side walls, it remains vertical as the bed 14 raises, hanging from its pivotal connection at the top, and the load (sand, gravel, salt, etc.) slides out of the bed 14 and under the tail gate 16, or is "dumped," due to gravity.

In many jurisdictions, a cloth, plastic, or similar cover-referred to herein as a "tarp" 18—is required to cover the top of the bed 14, preventing any of the load from escaping out of the open bed top, such as by wind or jostling due to potholes and the like, during transit. Such loss not only reduces the delivered load, but may present a hazard to road traffic.

The tarp 18 is wound on a motorized spool 20 at the top of the front wall of the dump truck bed 14, as shown in FIG. 1. Tarp arms 22 are pivotally mounted at their bottom ends to the dump truck bed 14, at or near the midpoint of the bed 14 length. The tarp arms 22 are biased towards an extended position, towards the rear of the dump truck bed 14. The tarp 18 is extended and retracted by controlling the motorized spool 20. Typically, the two positions of a rocker switch actuate the motorized spool 20 in different directions, to either extend or retract the tarp 18. FIG. 2 shows the tarp 18 in an intermediary position, as the motorized spool 20 is turning to unwind the tarp 18, and the tarp arms 22 draw the leading edge of the tarp 18 towards the rear of the bed 14. When the tarp 18 reaches the extent of its deployment or retraction, the operator should release the rocker switch to stop further movement of the motorized spool 20. FIG. 3 shows the tarp 18 fully extended. Operators typically monitor movement of the tarp arms 22 using the truck's external mirrors. When extended, the rearward bias of the tarp arms 22 places the tarp 18 in tension, which prevents it from "flapping" in the wind during transit.

Although this simple system works well under controlled circumstances, it may present a significant safety hazard in practice. As one example, at a quarry or mine, the tarp 18 must be retracted to expose the dump truck bed 14 so it may be filled with ore, aggregate, or other load. Regulations may require that the tarp 18 be extended prior to the dump truck 10 exiting the site and entering public roads. Because sitting still at the site exit to extend the tarp 18 is "dead time," dump truck operators may extend the tarp 18 during transit from the location of the dump truck 10 loading to the site exit, so the tarp 18 is extended by the time they reach the exit, and they can proceed to transport the load. This requires that the operator hold down the rocker switch controlling the spool 20 motor, and simultaneously monitor movement of the tarp arms 22 via the truck's mirrors, all while driving, e.g., a 10-ton loaded dump truck 10 over a winding, sloped, dirt road with a steep drop-off on one side. Further, if the operator shifts attention back to driving but continues to press the rocker switch, the tarp arms 22 will reach the extent of their motion, but the tarp 18 will continue to unwind. When the tarp 18 is fully unwound, if the spool 20 is still turning, it will wind the tarp 18 back on, but in the opposite direction. While the system is fully functional in this "inverted" spool 20 arrangement, the extend/retrack action the system will perform is opposite of that on the rocker switch labels. This may confuse the operator, further distracting him or her from the safety-critical task of driving the dump truck 10.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to aspects of the present disclosure, a tarp control system for a dump truck controls a motorized spool to automatically extend and retract the tarp in response to a non-continuous input from a user, in a normal operating mode. A rotary encoder attached to the motorized spool outputs the spool's motion to a controller. Upon receiving a non-continuous (i.e., momentary) user input to, e.g., extend the tarp, the controller controls the motor of the motorized spool to rotate in a direction to release the tarp. As it unwinds from the spool, the tarp is pulled over the open dump truck bed by the rearward-biased tarp arms. The controller tracks the amount of tarp released by monitoring the motorized spool motion. When the tarp reaches a (previously calibrated) fully extended position, the controller stops motion of the motorized spool. An inverse process retracts the tarp automatically in response to a non-continuous user input. The user inputs may comprise a user actuating a soft button displayed on a touchscreen display. The controller may output to the display a graphic presenting a representation of the movement of the tarp between the extended and retracted positions. The tarp control system allows a dump truck operator to momentarily press a single button, then ignore the tarp operation and concentrate on driving or other tasks, as the tarp extends or retracts automatically. The tarp control system eliminates the possibility of the tarp controls becoming reversed due to opposite-direction winding of the tarp on the motorized spool.

During the calibration procedure, in addition to storing the motorized spool motion for a tarp extension or retraction operation, the duration of operation of the motorized spool is also monitored, and a slightly longer duration is stored. A timer function is reset and started prior to controlling the motorized spool for each automatic tarp extension or retraction operation. If the timer function reaches the stored value, the rotary encoder has failed or the system has lost calibration (e.g., due to tarp stretch). To prevent overheating the motor or other damage, automatic control of the motorized spool is stopped, and the tarp control system enters a failsafe backup mode, where the motorized spool is operated manually in response to continuous user inputs, as in the prior art.

One aspect relates to a tarp control system for a dump truck. The tarp control system includes a tarp spooled onto a motorized spool attached to the dump truck. The tarp is biased towards an extended position by tarp arms. The tarp is operative to move between extended and retracted positions by control of the motorized spool. The tarp control system includes a rotary encoder configured to be attached to the motorized spool, and a controller. The controller includes non-transitory memory and a user interface. The controller is operatively connected to the rotary encoder and a motor of the motorized spool. The controller is configured to receive a non-continuous input via the user interface to extend or retract the tarp; control the motor of the motorized spool to turn the spool in one of a first direction to extend the tarp, and a second, opposite direction to retract the tarp; monitor motion of the motorized spool by monitoring an output of the rotary encoder; and automatically stop the spool when the tarp reaches a fully extended or fully retracted position.

Another aspect relates to a method of automatically controlling a tarp on a dump truck. A non-continuous user input to extend or retract the tarp is received. A motor of a motorized spool holding the tarp is controlled to turn the spool in one of a first direction to extend the tarp, and a second, opposite direction to retract the tarp. Motion of the motorized spool is monitored by monitoring an output of a rotary encoder attached to the motorized spool. The spool is automatically stopped when the tarp reaches a fully extended or fully retracted position.

Yet another aspect relates to a dump truck. The dump truck includes a bed having an open top, a motorized spool affixed to a first end of the bed, and a tarp wound onto the motorized spool. The dump truck further includes tarp arms affixed to the dump truck and the tarp, and biased toward a second end of the bed opposite the motorized spool. The dump truck also includes a rotary encoder attached to the motorized spool, and a controller having non-transitory memory and a user interface. The controller is operatively connected to the rotary encoder and a motor of the motorized spool, and is configured to receive a non-continuous input via the user interface to extend or retract the tarp; control the motor of the motorized spool to turn the spool in one of a first direction to extend the tarp, and a second, opposite direction to retract the tarp; monitor motion of the motorized spool by monitoring an output of the rotary encoder; and automatically stop the spool when the tarp reaches a fully extended or fully retracted position.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

FIG. 6 is a flow diagram of a method of automatically controlling a tarp on a dump truck.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the present disclosure may be practiced without limitation to these specific details. In this description, well-known methods and structures have not been described in detail so as not to unnecessarily obscure the present disclosure.

Figure 1:
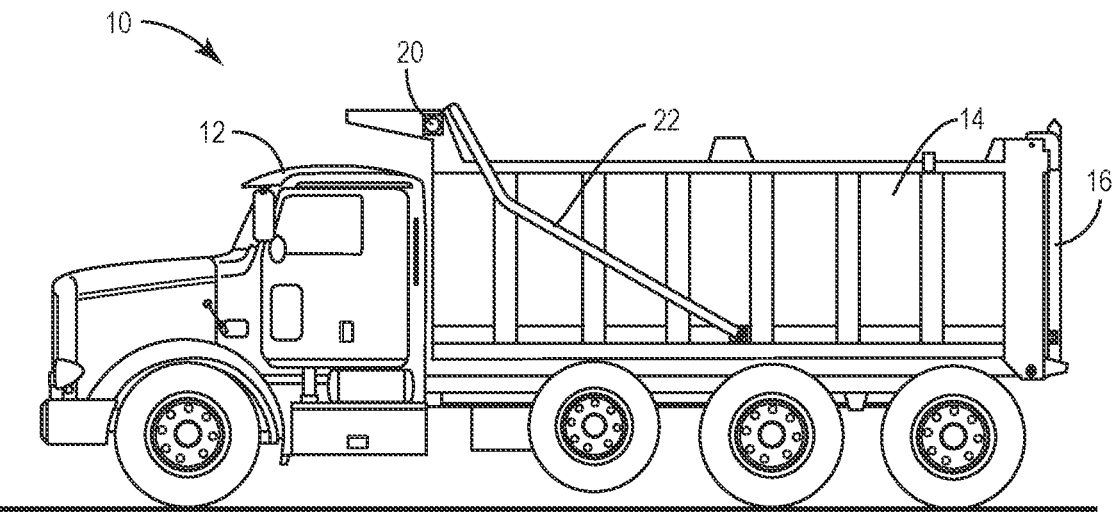
FIG. 1 is a side view of a dump truck with a tarp in a retracted position.
Figure 2:
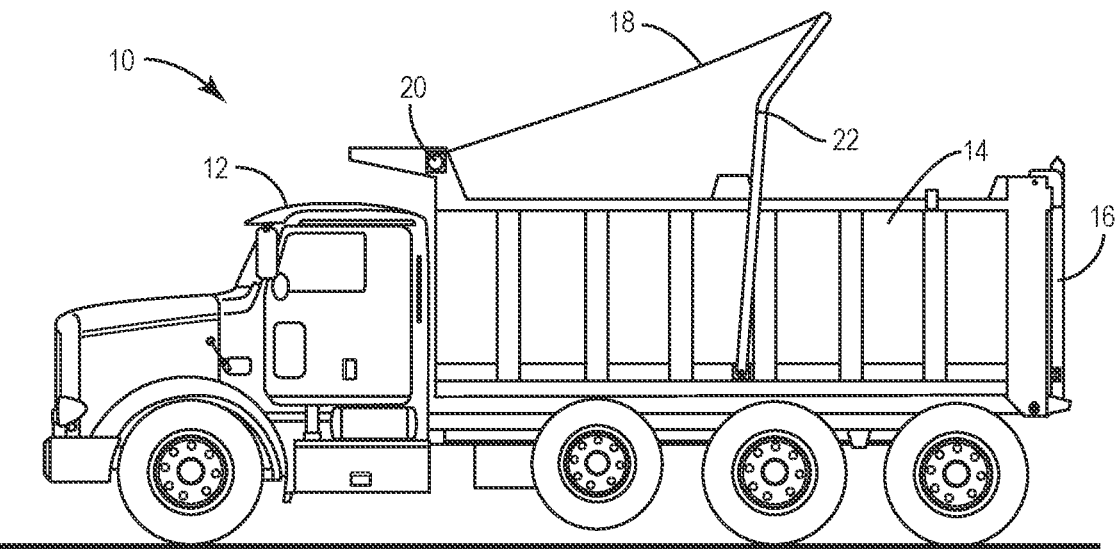
FIG. 2 is a side view of a dump truck with a tarp between retracted and extended positions.
Figure 3:
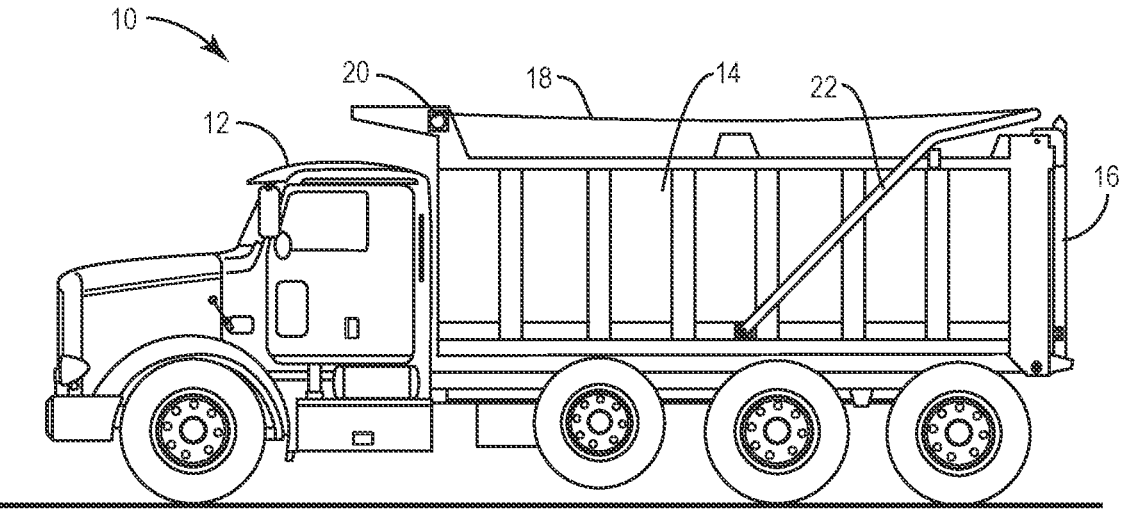
FIG. 3 is a side view of a dump truck with a tarp in an extended position.
Figure 4:
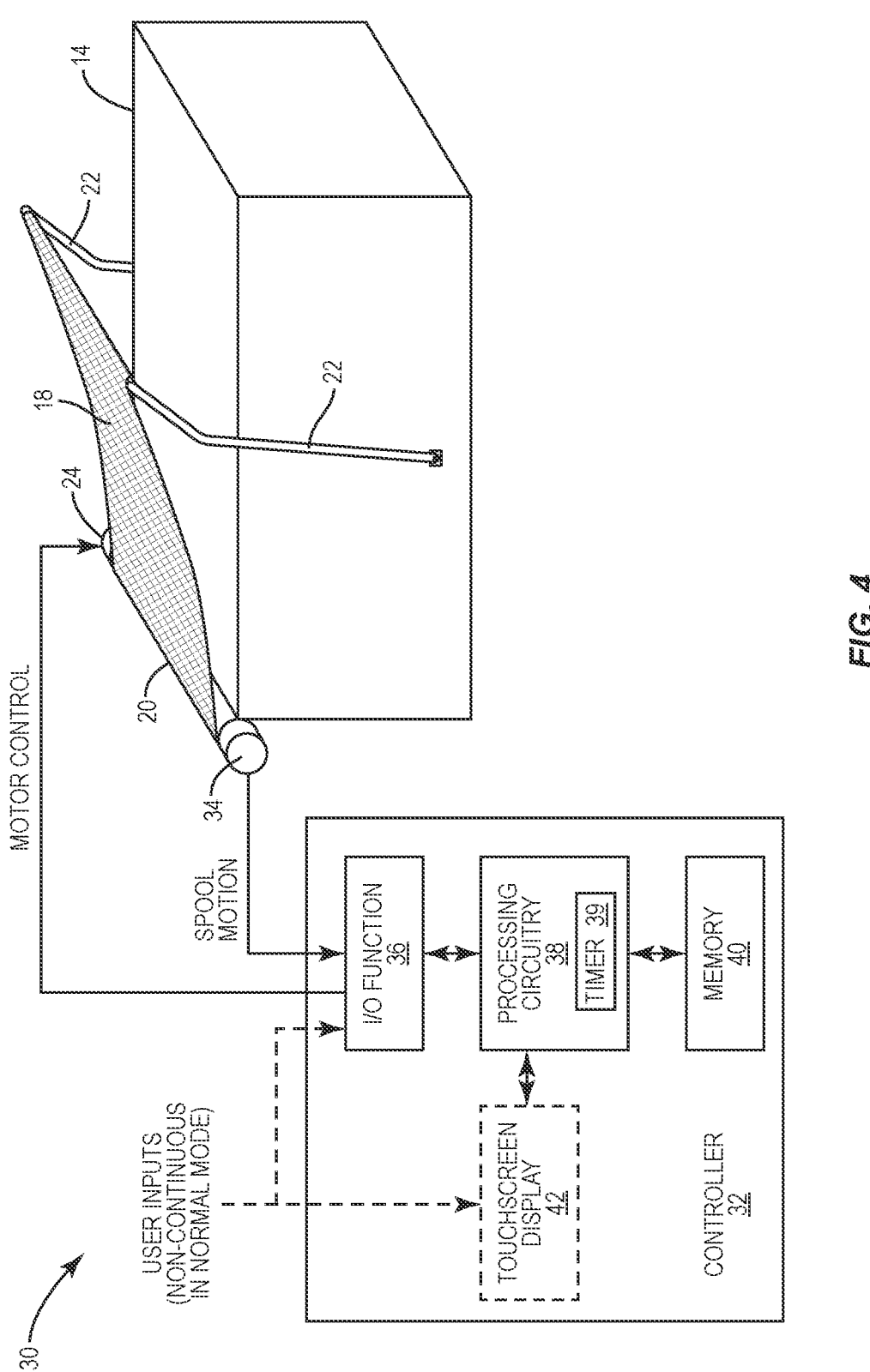
FIG. 4 is a block diagram showing a tarp control system in the context of a tarp on a dump truck bed.

FIG. 4 shows an example of a tarp control system 30, according to aspects of the present disclosure. The tarp control system 30 comprises a controller 32 and a rotary encoder 34. The rotary encoder 34 is configured to be attached to the shaft of a motorized spool 20 having a tarp 18 wound thereon. The controller 32 receives an output of the rotary encoder 34 to monitor rotary motion of the motorized spool 20.

The controller 32 also controls a motor 24 of the motorized spool 20. As with conventional tarp 18 control, with the tarp arms 22 biasing the leading edge of the tarp towards the rear of the dump truck bed 14, rotary motion of the motorized spool 20 controls the extension and retraction of the tarp 18 over the dump truck bed 14. The controller 32 controls tarp 18 extension/retraction by commanding the motor 24 which direction to turn, and for how long—the controller essentially replaces the prior art rocker switch, and automates the process such that the tarp 18 is always extended to the proper length.

The controller 32 determines how long to command the motor 24 to turn the spool 20 in two complimentary ways. First, in a normal operating mode, the controller 32 monitors the motion of the spool 20 via the rotary encoder 34, and compares the cumulative motion to a stored value determined during a prior calibration procedure. In one aspect, the rotary encoder 34 is an incremental optical rotary encoder. Second, a timer function 39 within the controller 32 monitors the duration that the motor 24 is controlled to wind or unwind the spool 20, and terminates the spool 20 motion if the timer function 39 reaches a predetermined target value, which is slightly longer than a normal extend or retract operation should take. The timer function 39 guards against failure of the rotary encoder 34, or loss of calibration, such as by tarp stretch. If the timer function 39 is triggered, it sends the controller 24 into a failsafe backup mode, wherein automatic control of the motor 24 is terminated, and the controller 24 defaults to manual operation, as in the prior art. These dual control modes provide for robust operation, eliminating the impact of a failure that could otherwise leave the dump truck unable to extend the tarp 18 (and thus violate road regulations) or retract the tarp 18 (which would prevent loading the bed 14).

Figure 5:
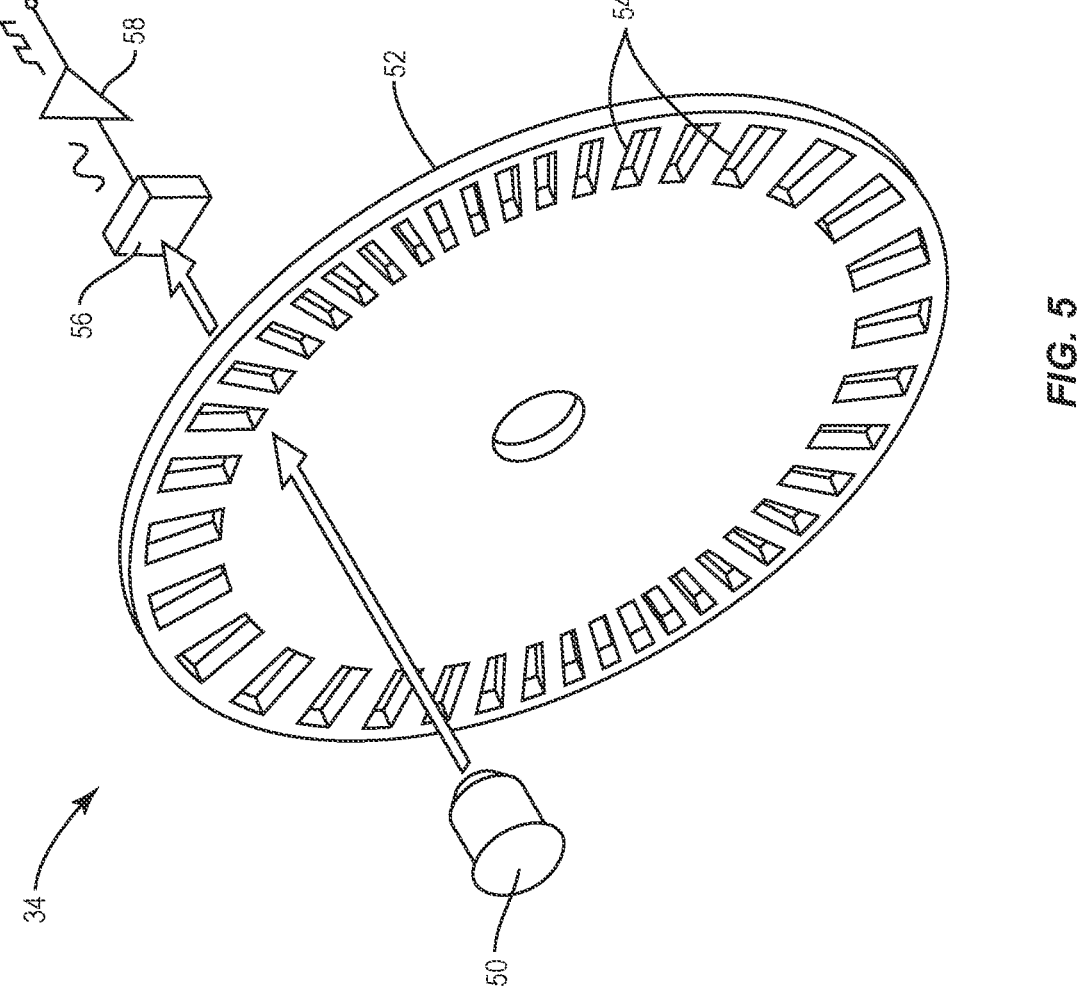
FIG. 5 is a diagram of the internal parts of an optical rotary encoder.

FIG. 5 shows the structure and operation of a simple optical rotary encoder 34. A light source, such as an LED 50 generates a light beam and directs it towards an encoding disk 52. The encoding disk 52 is opaque, and includes a plurality of radially spaced translucent or transparent windows 54. The encoding disk 52 is attached to the shaft of the motorized spool 20, and turns with the spool 20. An optical sensor 56, such as a phototransistor, is arranged on the opposite side of the encoding disk 52 as the LED 50, and aligned such that light beam from the LED 50 is incident on the sensor 56 when a window 54 allows the light to pass. Between windows 54, the opaque disk 52 blocks the light. As the motorized spool 20, and hence the encoding disk 52, rotates, light from the LED 50 is alternately passed to the sensor 56 and blocked from it, generating a repetitive waveform at the sensor 56 output. Depending on factors such as the number and spacing of windows 54, speed of rotation of the encoding disk 52, response time of the sensor 56, and the like, the repetitive waveform output by the sensor 56 may vary from a sine wave to an almost-square wave. A squaring circuit 58, such as a Schmitt trigger, converts the output of the sensor 56 to a well-defined square wave, suitable for processing by digital circuitry. In practice, the LED 50 and optical sensor 56 may operate in the infrared portion of the spectrum, such that the rotary encoder 34 is generally unaffected by ambient light in the visible spectrum. Rotary encoders are available that operate other than optically, such as using magnetics, etc. In one aspect, a suitable rotary encoder 34 is the Model HP-38 available from GS Global Resources in Mukwonago, WI.

The output of the rotary encoder 34 is thus typically a pulse train, wherein each pulse represents a known amount of angular motion, or rotation, of the motorized spool 20. The frequency of the pulse train indicates the rotary speed of the spool 20. A quadrature optical rotary encoder includes two optical circuits, and generates two non-aligned waveforms. In this case, the direction of rotation of the spool 20 can be determined by comparison of which pulse train leads the other. However, since the controller 32 directly controls the motor 24, detection of its direction of rotation by the rotary encoder 34 output is not necessary.

The tarp control system 30 can be calibrated in several ways. In one aspect, a calibration procedure is performed per pair of rotary encoder 34 and motorized spool 20, to convert a number of pulses to a known linear measurement, such as feet, meters, or the like. This conversion factor is stored by the controller 32. When this tarp control system 30 is installed on a dump truck 10, the system 30 is calibrated to that truck 10 by measuring the length of the dump truck bed 14 to be covered, and entering that length into the controller 32. The controller 32 uses the stored conversion factor to convert an ongoing count of pulses during an extension/retraction process into linear measurement, which is compared to the stored bed 14 length. This aspect may be particularly useful where a business or organization operates a fleet of dump trucks, all of which use the same combination of rotary encoder 34 and motorized spool 20, but have different truck bed 14 lengths. As discussed below, the controller 32 additionally monitors and stores the duration of motor 24 operation when extending and retracting the tarp 18.

In another aspect, the tarp control system 30 is calibrated directly in its "native" metric: pulse counts. A user initiates a calibration procedure, such as by selecting an option on the touchscreen display 42 of the controller 32, by actuating a calibration switch, or by other input. Beginning from the retracted position, the user provides a continuous "extend" input to the controller 32, which turns the motorized spool 20 to extend the tarp 18 until the user input stops—just like the rocker switch of the prior art. During this process, the controller 32 counts the total number of pulses received from the rotary encoder 34, and stores that count in memory. Later, during normal operating mode, upon receipt of a momentary input from a user to initiate the process, the controller 32 drives the motor 24 in the proper direction to retract or extend the tarp 18, while counting the pulses received from the rotary encoder 34. When the total count reaches the calibrated count stored in memory, the controller 32 stops driving the motor 24. This aspect may be particularly useful for calibrating individual dump trucks 10, or when dump trucks 10 in a fleet are equipped with different motorized spools 20 (which may yield different pulse counts per foot, meter, etc.). In this aspect also, the controller 32 additionally monitors and stores the duration of motor 24 operation when extending or retracting the tarp 18.

FIG. 4 shows a block diagram of the controller 32. The controller 32 may for example be implemented with a tablet computer, may be integrated into the dump truck dashboard, may be part of the truck chassis computer system, or the like. The controller 32 includes processing circuitry 38, timer function 39, non-transitory memory 40, Input/Output (I/O) functionality 36, and optionally (as indicated by dashed lines) a touchscreen display 42.

The processing circuitry 38 may comprise one or more hardwired state machines, programmable logic with associated firmware, one or more general purpose microprocessors or Digital Signal Processors with associated software, or any combination of these. The non-transitory memory 40 may comprise register files in the processing circuitry 38, solid state memory (e.g., DRAM, SRAM, SSD, Flash, etc.), optical media (e.g., CD, DVD), magnetic media, or any other type of non-transitory digital media known in the art. Although depicted as internal to the controller 32, the non-transitory memory 40 may include external data storage, such as an SD card, external disc drive, or the like.

As depicted in FIG. 4, the timer function 39 may be counter circuitry internal to the processing circuitry 38 or a software routine executed on the processing circuitry 38. Alternatively, the timer function 39 may comprise an external timer that is controlled by the processing circuitry 38. In one aspect, during the above-described calibration procedure, the processing circuitry 38 additionally records the duration of continuous motor 24 operation. This value is increased by a small factor, such as 10%, and the result is stored as the timer function 39 target value. Upon a user initiating an automatic extension or retraction of the tarp 18, the processing circuitry 38 resets and starts the timer function 39. Under normal usage—that is, in a normal operating mode—the controller 24 will stop turning the motor 24 prior to the timer function 39 reaching the target value. However, in case of a rotary encoder 34 malfunction, miscalibration, or other failure, the motor 24 may continue to turn the spool 20 after the tarp 18 should be fully extended or retracted. If allowed to continue, this could result in overheating or other damage to the motor 24. In this case, when the timer function 39 reaches the target value, it alerts the processing circuitry 38 that the motor has run for longer than should have been required. Upon this alert, the controller 32 enters a failsafe backup mode. It stops the motor 24 and issues an audible and/or visible alert, such as to the touchscreen display 42, that the tarp control system 30 has malfunctioned. Thereafter, in the failsafe backup mode, the controller 32 functions as a prior art system, whereby the user inputs—which are momentary, or non-continuous, inputs in normal operating mode—are now continuous inputs. The controller turns the motor 24 for as long as one or the other input is continuously applied. In failsafe backup mode, the dump truck operator must monitor the progress of the tarp arms 22, and discontinue input to the controller 24 when they reach the extended or retracted position. As described above, the user inputs may be soft buttons on the touchscreen display 42, or external switches (such as the prior art rocker switch).

The I/O functionality 36 is configured to receive at least an output of the rotary encoder 34 (i.e., a pulse train signal). The I/O functionality 36 is further configured to output controls to the motor 24 of the motorized spool 20. For example, the motor control output may comprise two signals (i.e., forward and reverse), wherein a voltage and/or current on one signal drives the motor 24 in one direction, and vice versa (i.e., replacing the functionality of a rocker switch). In some aspects, the I/O functionality 36 additionally receives non-continuous inputs (i.e., momentary button presses) from an operator during normal operating mode, and continuous inputs during failsafe backup mode.

U.S. Pat. No. 11,377,805 (System and Method for Control of Operational Aspects of a Snow Plow Blade and/or Spreader), by the present Applicant, describes a controller operative to receive user input and control various equipment on a dump truck, such as a hydraulic system and other accessories. The controller may be implemented in a tablet computer mounted in the dump truck cab. The controller may interface to the dump truck, such as by connecting to an OnBoard Diagnostics (OBD) port, or by comprising a node on a Controller Area Network (CAN) bus. User input may be via soft buttons displayed on a touchscreen display, or by repurposing steering-wheel mounted buttons that are typically used to control audio or cruise control. The disclosure of this patent, as well as U.S. patents applications Ser. No. 17/840,197 (Automated Speed-Triggered Bed Lowering System and Method with Manual Override) and Ser. No. 18/119,930 (Automated Dump Truck Tailgate Control), which describe a similar controller implementing other functionality, are incorporated by reference herein, in their entireties.

In one aspect, the tablet-based controller described in the cited patent and applications also implements the controller 32 described herein. In this aspect (as indicated by a dashed line), the momentary user inputs to initiate automatic extension or retraction of a tarp 18 during normal operating mode (or continuous inputs during failsafe backup mode) comprise the operator tapping (or holding) soft buttons displayed on the touchscreen display 42. In another aspect (as indicated by a dashed line), the non-continuous or continuous user inputs comprise the actuation of other switches, which are sensed by, or relayed to, the I/O functionality 36 of the controller 32. As one example, the switches may be steering wheel mounted switches with alternate functionality assigned to them, as described in detail in the '805 patent cited above.

In these aspects, the touchscreen display 42 may also output a visual indication of the tarp 18 extension and retraction process. For example, the touchscreen display 42 may display an outline of a bar with endpoints labeled "RET" and "EXT", and the bar fills or empties with color proportionately to the progress of the tarp 18 extension or retraction motion. As another example, the touchscreen display 42 may display a graphic icon representing a dump truck and show the tarp 18 progress during tarp 18 extension or retraction operations.

The controller 32 has a user interface, but is not limited to a touchscreen display 42 as described above. In one aspect, the controller 32 user interface is simply two push-button switches (or the two positions of a rocker switch), which an operator momentarily presses to initiate an automated tarp 18 extension or retraction process in normal operating mode (or holds continuously in failsafe backup mode).

FIG. 6 depicts the steps in a method of automatically controlling a tarp 18 on a dump truck 10. A non-continuous user input to extend or retract the tarp 18 is received (block 102). A motor 24 of a motorized spool 20 holding the tarp 18 is controlled to turn the spool 20 in one of a first direction to extend the tarp 18, and a second, opposite direction to retract the tarp 18 (block 104). Motion of the motorized spool 20 is monitored by monitoring an output of a rotary encoder 34 attached to the motorized spool 20 (block 106). When the tarp 18 reaches a fully extended or fully retracted position (block 108), the spool 20 is automatically stopped (block 110). The decision whether the tarp 18 has reached a fully extended or fully retracted position (block 108) may be made by maintaining a count of pulses received from the rotary encoder 34, and comparing the count to a stored value previously determined during a calibration procedure. The stored value may represent a linear measurement (i.e., feet, meters, etc.) or it may simply be a count of pulses.

Aspects of the present disclosure present numerous advantages over the prior art. By automating the process of extending or retracting a tarp 18 of a dump truck 10, an operator need not be distracted by continuously monitoring the position of tarp arms 22 while holding down a button such as a rocker switch. This may dramatically improve safety, particularly if the operator attempts to extend or retract the tarp 18 while driving the dump truck 10. A backup failsafe mode prevents damage in the event of component failure or malfunction, while still allowing for manual extension and retraction of the tarp 18.

In some aspects, the tarp control system 30 is easily retrofitted to existing dump trucks 10 by attaching the rotary encoder 34 to a shaft of an existing motorized spool 20, and replacing wires controlling the motor 24 with motor control outputs of the controller 32. The controller 32 may be installed in the dashboard of the dump truck cab 12; integrated into a control bus of the dump truck 10 (e.g., be a CAN bus node); or may comprise a tablet computer mounted in the dump truck cab 12. In some embodiments, the tarp control system 30 is integrated with a motorized spool 20, and sold together with the spool 20, and/or as part of a tarp system (together with tarp arms 22, mounting hardware, etc.). In some embodiments, the tarp control system 30 is integrated into the design of the dump truck 10 by the original manufacturer.

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A tarp control system for a dump truck including a tarp wound onto a motorized spool attached to the dump truck, and biased towards an extended position by tarp arms, and operative to move between extended and retracted positions by control of the motorized spool, the tarp control system comprising:

a rotary encoder configured to be attached to the motorized spool;

a controller, having non-transitory memory and a user interface, operatively connected to the rotary encoder and a motor of the motorized spool, the controller configured to receive a non-continuous input via the user interface to extend or retract the tarp;

control the motor of the motorized spool to turn the spool in one of a first direction to extend the tarp, and a second, opposite direction to retract the tarp;

monitor motion of the motorized spool by monitoring an output of the rotary encoder;

monitor an elapsed time since receipt of the non-continuous input;

in a normal operating mode, automatically stop the spool when monitoring of the output of the rotary encoder indicates the tarp reaches a fully extended or fully retracted position; and enter a failsafe backup mode in response to the elapsed time since receipt of the non-continuous input exceeding a predetermined target value, wherein in failsafe backup mode the controller controls the motor of the motorized spool to turn the spool only in response to continuous user input via the user interface to extend or retract the tarp.

2. The system of claim 1 wherein the non-transitory memory of the controller holds calibration data relating motion of the motorized spool to a distance between fully retracted and extended positions.

3. The system of claim 1 wherein the rotary encoder is an incremental encoder that outputs changes in the rotary position of the motorized spool.

4. The system of claim 3 wherein the rotary encoder outputs a series of pulses, each corresponding to a predetermined amount of rotation of the motorized spool.

5. The system of claim 1 wherein the user interface comprises a touchscreen display, and wherein the non-continuous input comprises a user actuating a soft button on the touchscreen display.

6. The system of claim 5 further comprising displaying on the display a graphic representation of the movement of the tarp between the extended and retracted positions.

7. The system of claim 1 wherein the controller further includes a timer function, and wherein controller is further configured to:

reset and start the timer function prior to controlling the motor of the motorized spool prior to each tarp extension or retraction operation; and in response to the timer function reaching the predetermined target value that is longer than the duration the motor operates to fully extend or retract the tarp, stop the motor.

8. A method of automatically controlling a tarp on a dump truck, comprising:

receiving a non-continuous user input to extend or retract the tarp;

controlling a motor of a motorized spool holding the tarp, to turn the spool in one of a first direction to extend the tarp, and a second, opposite direction to retract the tarp;

monitoring motion of the motorized spool by monitoring an output of a rotary encoder attached to the motorized spool; and monitoring an elapsed time since receipt of the non-continuous input;

in a normal operating mode, automatically stopping the spool when monitoring of the output of the rotary encoder indicates the tarp reaches a fully extended or fully retracted position; and entering a failsafe backup mode in response to the elapsed time since receipt of the non-continuous input exceeding a predetermined target value, wherein in failsafe backup mode, controlling the motor of the motorized spool to turn the spool only in response to continuous user input via the user interface to extend or retract the tarp.

9. The method of claim 8 further comprising, prior to receiving the non-continuous user input to extend or retract the tarp:

performing a calibration relating motorized spool motion to tarp position; and storing calibration data relating motion of the motorized spool to a distance between fully retracted and extended positions.

10. The method of claim 8 wherein the user interface comprises a touchscreen display, and wherein the non-continuous input comprises a user actuating a soft button on the touchscreen display.

11. The method of claim 10 further comprising displaying on the display a graphic representation of the movement of the tarp between the extended and retracted positions.

12. The method of claim 8 further comprising:

resetting and starting a timer function prior to controlling the motor of the motorized spool prior to each tarp extension or retraction operation; and in response to the timer function reaching the predetermined target value that is longer than the duration the motor operates to fully extend or retract the tarp, stopping the motor.

13. A dump truck, comprising:

a bed having an open top;

a motorized spool affixed to a first end of the bed;

a tarp wound onto the motorized spool;

tarp arms affixed to the dump truck and the tarp, and biased toward a second end of the bed opposite the motorized spool;

a rotary encoder attached to the motorized spool; and a controller, having non-transitory memory and a user interface, operatively connected to the rotary encoder and a motor of the motorized spool, the controller configured to receive a non-continuous input via the user interface to extend or retract the tarp;

control the motor of the motorized spool to turn the spool in one of a first direction to extend the tarp, and a second, opposite direction to retract the tarp;

monitor motion of the motorized spool by monitoring an output of the rotary encoder; and monitor an elapsed time since receipt of the non-continuous input;

in a normal operating mode, automatically stop the spool when monitoring of the output of the rotary encoder indicates the tarp reaches a fully extended or fully retracted position; and enter a failsafe backup mode in response to the elapsed time since receipt of the non-continuous input exceeding a predetermined target value, wherein in failsafe backup mode the controller controls the motor of the motorized spool to turn the spool only in response to continuous user input via the user interface to extend or retract the tarp.

14. The dump truck of claim 13 wherein the non-transitory memory of the controller holds calibration data relating motion of the motorized spool to a distance between fully retracted and extended positions.

15. The dump truck of claim 13 wherein the user interface comprises a touchscreen display, and wherein the non-continuous input comprises a user actuating a soft button on the touchscreen display.

16. The dump truck of claim 15 further comprising displaying on the display a graphic representation of the movement of the tarp between the extended and retracted positions.

17. The dump truck of claim 13 wherein the controller further includes a timer function, and wherein controller is further configured to:

reset and start the timer function prior to controlling the motor of the motorized spool prior to each tarp extension or retraction operation; and in response to the timer function reaching the predetermined target value that is longer than the duration the motor operates to fully extend or retract the tarp, stop the motor.

* * * * *